A. L. HEITZMAN.
DIRIGIBLE AUTO LAMP.
APPLICATION FILED MAR. 23, 1918.

1,294,906.

Patented Feb. 18, 1919.
2 SHEETS—SHEET 1.

Witnesses

Inventor
A. L. Heitzman,
By Victor J. Evans
Attorney

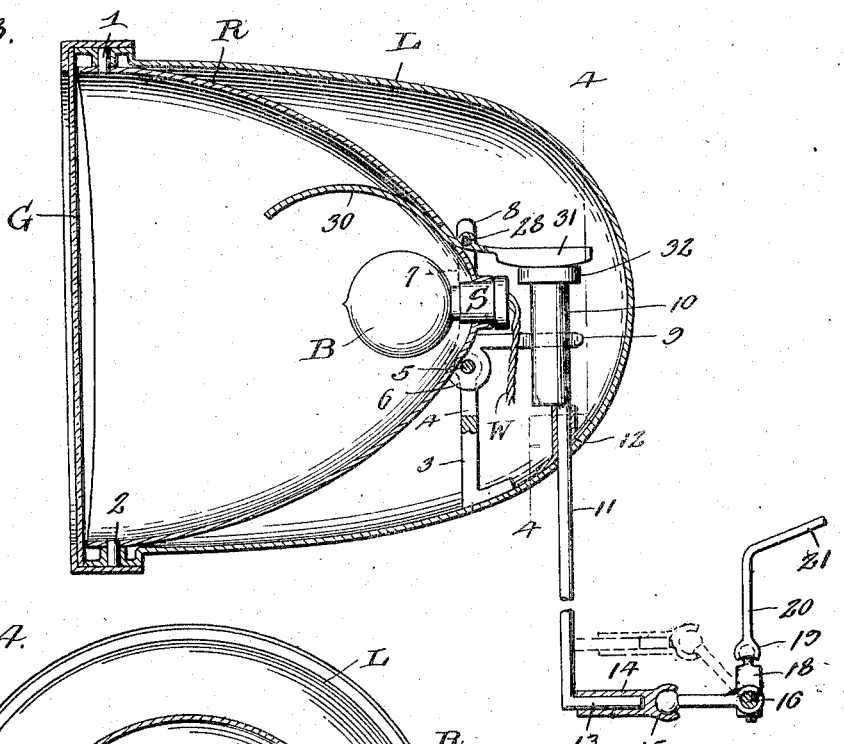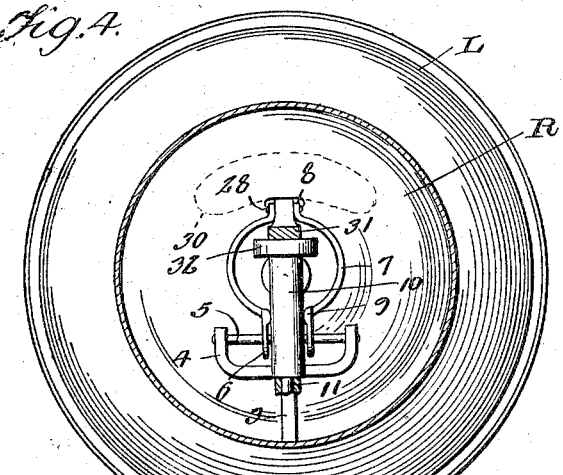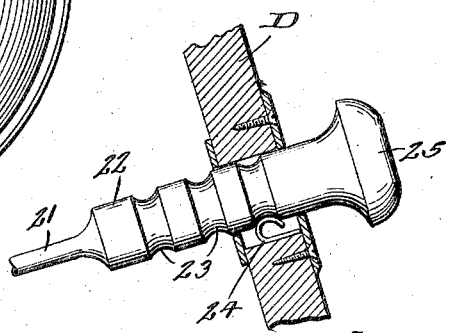

UNITED STATES PATENT OFFICE.

ANTHONY L. HEITZMAN, OF LA GRANDE, OREGON.

DIRIGIBLE AUTO-LAMP.

1,294,906.

Specification of Letters Patent. Patented Feb. 18, 1919.

Application filed March 23, 1918. Serial No. 224,142.

*To all whom it may concern:*

Be it known that I, ANTHONY L. HEITZMAN, a citizen of the United States, residing at La Grande, in the county of Union and State of Oregon, have invented new and useful Improvements in Dirigible Auto-Lamps, of which the following is a specification.

This invention relates to illumination, and more especially to light supports which are dirigible; and the object of the same is to produce an automobile headlight in which the reflector is pivoted so that it may be moved from side to side by the operator to direct the rays of light to one side or the other according to the direction in which the front wheels are turned.

A further object is to employ a dimmer, or more properly speaking a baffle or shade pivotally mounted and capable of being thrown down over the bulb within the lamp or lamps to interrupt their horizontal beams or rays of light when occasion requires that they be taken out of the eyes of an approaching person, and directed onto the ground.

With these objects in view the invention consists of the details hereinafter more fully described and claimed, and as shown in the accompanying drawings in which—

Fig. 3 is an enlarged vertical section through the center of a lamp box equipped with this invention, and a side elevation of the operating mechanism therefor.

Fig. 4 is a transverse section taken on the line 4—4 of Fig. 3.

Fig. 5 is an enlarged detail view of adjusting handle; and

Fig. 6 is a perspective detail of the reflector holder.

Figure 1:
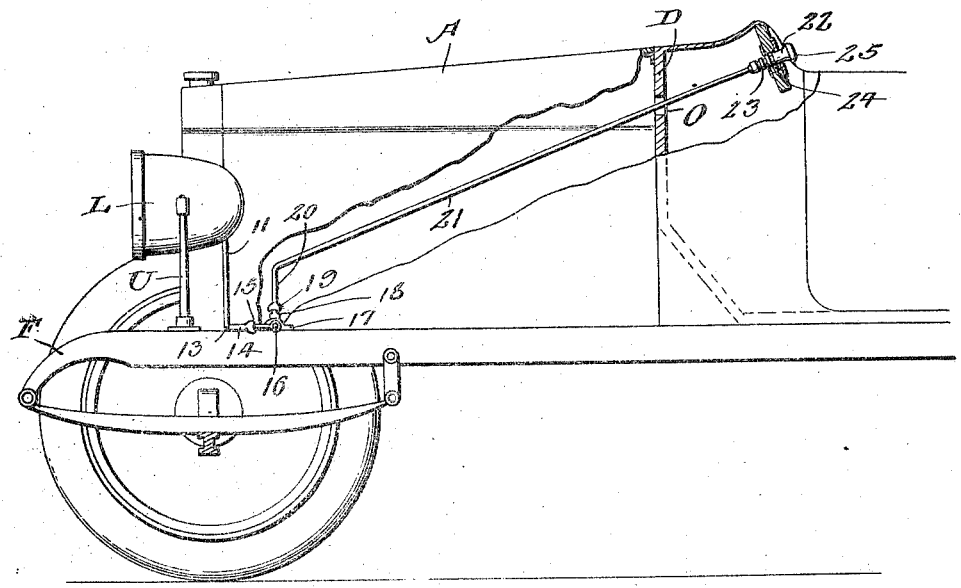
Figure 1 is a side elevation.
Figure 2:
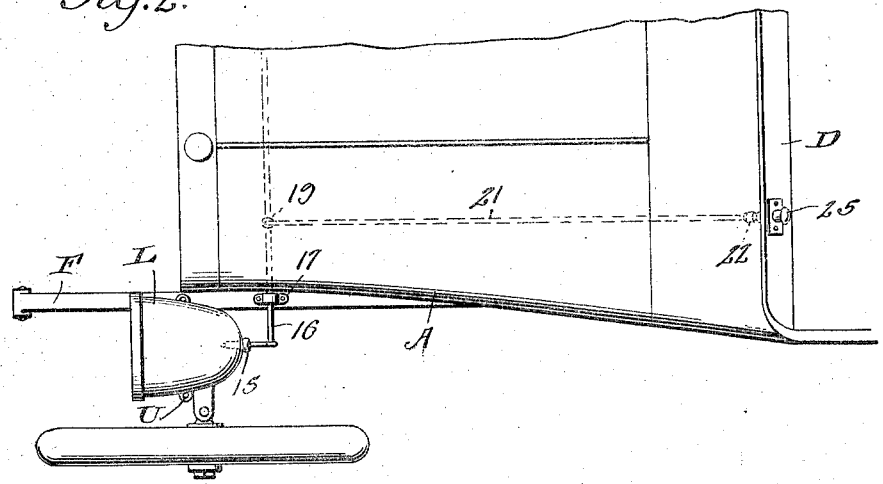
Fig. 2 is a plan view of a portion of an automobile equipped with this invention.

The automobile herein shown is equipped with a pair of headlights and each consists of a lamp box L mounted on uprights U at the front end of the frame F, a reflector R within the lamp box carrying a socket S in which is mounted an electric bulb B which at proper times is lighted by means of an electric current led along wires W from a suitable source, not shown. No novelty is claimed for these parts, nor for the structure of the automobile A and its dash D.

The reflector R may be of any suitable type, but it should be of somewhat less depth than the lamp box L, as best seen in Fig. 3, and the operating mechanism yet to be described is located in rear of the reflector and carried down through the bottom of the lamp box as shown. The front end of the reflector is pivotally mounted at 1 and 2 at top and bottom within the front end of the lamp box behind the glass G, and the latter is preferably of such size that rays from the bulb B may shine through the glass for a considerable distance ahead and will illuminate an ample path. My invention consists in providing mechanism whereby the reflector may be swung about on its pivots or the bulb may be baffled at times.

Rising from the bottom of the lamp box L is a bracket 3 having its upper end 4 divided or forked and carrying a horizontal guide rod 5, and on this guide rod slide eyes 6 depending from the angle of a reflector holder which is constructed as best seen in Fig. 6. This holder rises above said eyes in a loop or ring 7 which loosely embraces the rear portion of the reflector R and has upstanding ears 8 at its top for a purpose yet to appear; while projecting rearwardly from the angle of the holder and just above the eyes is a pair of fingers 9.

Between said fingers is disposed an upright cam 10 mounted eccentrically and fast upon an upright shaft 11 which latter is mounted slidably and rotatably within a bearing 12 in the bottom of the lamp box as best seen in Fig. 3 and is cranked as at 13 at its lower end. Upon this crank is slidably or telescopically mounted one member 14 of a ball-and-socket connection 15 whose other member projects radially and rigidly from a cross rod 16 journaled in bearings 17 carried by the frame work F, and extending over to the other lamp not shown in the drawing, this rod therefore constituting a shaft for operating the mechanism yet to be described. While any appropriate means may be provided for actuating this shaft from a point within reach of the driver, I prefer to provide it at a suitable point with a crank 18 having ball-and-socket connection 19 with another crank 20 at the lower end of a rod 21 which extends loosely through an opening O in the dash D; and this rod carries at its upper end a handle 22 provided with a series of annular grooves 23 frictionally engaged by a spring catch 24 as best seen in Fig. 5. The upper end of the handle is enlarged into a hand-grip or knob 25, and it is obvious that the operator can grasp this knob and pull or push the handle to cause another groove to engage the spring, or rotate the handle to turn the rod 21 while the spring remains in a single groove as shown. It is also obvious that longitudinal movement of the rod will cause rocking of the shaft 16 and vertical movement of each upright shaft 11 for a purpose yet to be described, whereas oscillation of the handle and rod 21 will, through the crank 20 of the latter and its ball-and-socket connection with the shaft 16, cause the longitudinal reciprocation of the latter and therefore the oscillation of both upright shafts 11. This will turn their eccentric cams 10, and, as each cam stands between a pair of fingers 9 as indicated in Fig. 6, the reflector holder will be moved from side to side on the guide rod 5, and its ring 7 will swing the rear end of the reflector while the front end of the latter turns on the pivots 1 and 2.

Between the ears 8 at the point 28 is pivoted the shank of a dimmer or baffle. The latter consists of a lever whose front arm is a plate 30 curved as best seen in Fig. 3 and whose standing raised above the bulb B, and whose rear arm has a weight 31 which stands over and rests on the enlarged head 32 of the cam 10. Normally rays or beams of light from the bulb B may have the widest possible vertical divergence. When now the operator draws on the handle 22 and engages another groove 23 with the spring 24 than that shown in Fig. 5, upward movement of the rod 21 turns the shaft 16 with the result that the cranks on the latter cause the rise of the upright shafts 11 and their cams 10. The head on each cam underlies the rear arm of a baffle, and the latter is therefore caused to turn on its pivot 28 and its front arm or plate 30 passes down partly over the bulb B, so that all rays of light are cut off excepting those which shine through the lower portion of the glass G and onto the roadway immediately in front of the machine.

Therefore it will be obvious that the operator has the widest control through the manipulation of a single handle, of both lamps, on the lighting system of his machine. He can swing their reflectors from side to side to make the beams of light follow the wheels as they are turned, or he can turn down the baffle plates to cut off the higher rays of light at will, which he will doubtless do when he approaches another automobile, as required by the road rules in many communities.

What I claim is:

1. In a lamp for automobiles and the like, the combination with a support, a reflector pivoted in the support for horizontal swinging, a light carried by and within the reflector, and a dimmer or baffle plate pivoted in the reflector for movement over the light; of means for turning the reflector from side to side, means for positioning said baffle plate over the light, and a unitary actuating mechanism for selectively operating the baffle plate and oscillating the reflector for the purpose set forth.

2. In a lamp for automobiles and the like, the combination with a support, a reflector pivoted in the support for horizontal swinging, a light carried by and within the reflector, and a dimmer or baffle plate pivoted in the reflector for vertical movement over the light; means for swinging the reflector horizontally on its pivots, means for swinging the plate vertically on its pivot, and manually operable mechanism extending from the support to a point near the driver whereby said means may be selectively actuated at will or conjointly actuated if desired.

3. In a lamp for automobiles and the like, the combination with a support, a reflector pivoted in the support for horizontal swinging, a light carried by and within the reflector, and a dimmer or baffle plate pivoted in the reflector for vertical movement over the light; of a ring embracing the rear of the reflector and supporting the pivot of said plate, fingers projecting rearward from said ring, an upright shaft standing between said fingers, an eccentric cam rigidly mounted on said shaft, a weighted rear arm on said plate overlying the cam, and manually operable means for oscillating said shaft or reciprocating it vertically at will, for the purpose set forth.

4. In a dirigible lamp, the combination with a lamp box, and a reflector mounted on upright pivots in the forward part of said box and carrying a lamp within its rear portion; of a transverse guide rod within the box in rear of said reflector, a holder including a ring embracing the reflector, eyes slidably mounted on said guide rod, and spaced fingers projecting rearward, an upright shaft mounted through the bottom of the lamp box, a cam eccentrically mounted on the shaft between said fingers, and manually operable means for oscillating said shaft, for the purpose set forth.

5. In a dirigible lamp, the combination with a lamp box, and a reflector mounted on upright pivots in the forward part of said box and carrying a lamp within its rear portion; of a reflector holder connected with the rear part of the reflector and having spaced fingers, a bracket rising from the bottom of the lamp box and forked at its upper end, a guide rod carried in the fork-arms and on which said holder is slidably mounted, an upright shaft mounted through the bottom of the lamp box, a cam eccentrically mounted on the shaft between said fingers, and manually operable means for oscillating said shaft, for the purpose set forth.

6. In a dirigible lamp, the combination with a lamp box, a transverse guide rod therein, a reflector and lamp, and a reflector holder slidably mounted on said rod and having parallel spaced fingers projecting to the rear; of an upright shaft journaled through the lamp box and having an eccentric cam standing between said fingers and a crank at its lower end, a cross shaft slidably mounted in bearings on the automobile frame, ball-and-socket connections between the shaft and said crank, a rod movably mounted at its upper end through the automobile dash and having a crank at its lower end, and ball-and-socket connections between this crank and said cross shaft.

7. In a dirigible lamp, the combination with a lamp box, a transverse guide rod therein, a reflector and lamp, a reflector holder slidably mounted on said rod and having parallel spaced fingers projecting to the rear, and a dimmer plate or baffle pivoted in said holder and having its front end overlying the lamp and a weighted arm at its rear end; of an upright shaft mounted to rotate and slide in the lamp box, an eccentric cam thereon standing between said fingers and under-lying said weighted arm of the baffle, a crank at the lower end of said upright shaft, a cross shaft mounted to rotate and slide in bearings on the automobile frame, ball-and-socket connections between the shaft and said crank, a rod mounted to slide and rotate within the dash and having a crank at its lower end, and ball-and-socket connections between this crank and said cross shaft.

In testimony whereof I affix my signature.

ANTHONY L. HEITZMAN.

Copies of this patent may be obtained for five cents each, by addressing the "Commissioner of Patents, Washington, D. C."